United States Patent
Williams et al.

(10) Patent No.: US 7,861,934 B1
(45) Date of Patent: Jan. 4, 2011

(54) DEVICES AND METHOD FOR RECORDING SALES LEADS

(75) Inventors: Clark K. Williams, Hinsdale, IL (US); Paul McCaffray, LaGrange, IL (US); Ernesto G. deVenecia, Wonder Lake, IL (US)

(73) Assignee: CompuSystems, Inc., Broadview, IL (US)

( * ) Notice: Subject to any disclaimer, the term of this patent is extended or adjusted under 35 U.S.C. 154(b) by 310 days.

(21) Appl. No.: 11/740,730

(22) Filed: Apr. 26, 2007

Related U.S. Application Data

(60) Provisional application No. 60/798,222, filed on May 5, 2006.

(51) Int. Cl.
*G06K 7/10* (2006.01)

(52) U.S. Cl. .................................. 235/462.09

(58) Field of Classification Search ............. 235/462.09
See application file for complete search history.

(56) References Cited

U.S. PATENT DOCUMENTS 5,490,217 A * 2/1996 Wang et al. .................... 380/51
5,818,023 A * 10/1998 Meyerson et al. ............ 235/470
6,000,607 A * 12/1999 Ohki et al. ................... 235/379
6,282,612 B1 * 8/2001 Sakajiri et al. ............... 711/115
6,959,871 B1 * 11/2005 Herrod et al. ........... 235/462.13
6,988,664 B1 * 1/2006 Lee et al. ................ 235/472.01
7,472,825 B2 * 1/2009 Fitch et al. ................... 235/379
2002/0087816 A1 * 7/2002 Atkinson et al. ............. 711/156
2004/0140361 A1 * 7/2004 Paul et al. ............... 235/462.45
2004/0211836 A1 * 10/2004 Patel et al. .............. 235/462.11
2005/0237556 A1 * 10/2005 Watkins ...................... 358/1.13
2007/0199994 A1 * 8/2007 Cattrone et al. ......... 235/462.04

* cited by examiner

*Primary Examiner*—Daniel A Hess
*Assistant Examiner*—David Tardif
(74) *Attorney, Agent, or Firm*—McDonnell Boehnen Hulbert & Berghoff LLP

(57) ABSTRACT

A sales lead recorder and a method of operation are described. The sales lead recorder may be used at an exhibition (or similar venue) to capture, compile, and output sales lead data associates with attendees of the exhibition. When an attendee provides a badge, the sales lead recorder captures embedded sales lead data within the badge. The presented recorder includes an imager that may capture a variety of embedded codes positioned at a variety of locations with a badge. In addition, the sales recorder is optimized for configuring the sales recorder according to an exhibitor's preferences. Furthermore, a variety of downloading and output options for sales lead data are available.

9 Claims, 7 Drawing Sheets

AM Expo 2005
May 25-26, 2005
CompuSystems, Inc.
LEAD #1

Badge No. 136102457                    25-May-05 01:52 PM
John M. Doe
Operations Team Leader
ABC Company
123 Any Street
Any City, IL 12345-6789 USA
PH: 123 4567890000000        FX: 0987654321111
EM: email@email.com VISTOR PROFILE
REG EVENT CODE:          CONFERENCE
ANNUAL BUDGET:           UNDER $25K
SIZE OF COMPANY:         501-1000
PRIMARY JOB INDUSTRY:    OTHER TRANS EQPMT/MFG QUALIFIERS
SEND INFORMATION         NEEDS TECHNICAL DATA
INVESTIGATING
WILL PURCH IN 30 DYS

COMENTS

---

AM Expo 2005
May 25-26, 2005
CompuSystems, Inc.
LEAD #3

Badge No. 136102457                    25-May-05 01:53 PM
John M. Doe
Manager Customer Tech Support
ABC Company
123 Any Street
Any City, IL 12345-6789 USA
PH: 123 4567890000000        FX: 0987654321111
EM: email@email.com VISTOR PROFILE
REG EVENT CODE:          CONFERENCE
ANNUAL BUDGET:           UNDER $25K
SIZE OF COMPANY:         1-50
JOB FUNCTION:            MFG & PRO ENGINEERING
PRIMARY JOB INDUSTRY:    PLASTICS/RUBBER

QUALIFIERS
SEND QUOTE               HAVE REP CALL

COMENTS

---

AM Expo 2005
May 25-26, 2005
CompuSystems, Inc.
LEAD #4

Badge No. 136102457                    25-May-05 01:54 PM
John M. Doe
Vice President
ABC Company
123 Any Street
Any City, IL 12345-6789 USA
PH: 123 4567890000000        FX: 0987654321111
EM: email@email.com VISTOR PROFILE
REG EVENT CODE:          CONFERENCE
ANNUAL BUDGET:           $50-99K
SIZE OF COMPANY:         501-1000
JOB FUNCTION:            INSTRUMENTAL ENGINEER
PRIMARY JOB INDUSTRY:    OTHER ELECTRONIC PRODU

QUALIFIERS
ADD TO MAILING LIST      JUST INVESTIGATING
WILL PURCH IN 30 DYS

COMENTS

| FN Prefix |
| First Name |
| Middle Initial |
| LN Prefix |
| Last Name |
| LN Suffix |
| Title |
| Company 1 |
| Company 2 |
| Address1 Number |
| Address1 Street |
| Address2 |
| Address3 |
| email |
| City |
| State/Province |
| Mail Code |
| Country Code |
| Country |
| Phone |
| Fax |
| evt_uid®_uid |
| org_id |
| Def.1 |
| Def.2 |
| Visitor Profile Triplets+ |

Notes:
* The data may be pipe delimited with a total static number of 25 delimiters and an ending character represented by a "+" sign.
* Address 1 is generally given in its complete form in Address 1 Number, but it could be split between the two fields.
* The event_uid & registration_uid are a concatenation of two IDs; the first three digits may be the evt_uid and the remaining digits of varying length are the reg_uid.
* Organizational ID "org_id" may be the unique id for the Exhibiting Company that is renting a particular booth space. Exhibitors will have an org_id entered in this field.
* Def.1 & Def.2 may be definable fields used by CSI to place text.
* Visitor Profile triplets may be three digit codes to represent demographic responses and conference sessions selected.

DEVICES AND METHOD FOR RECORDING SALES LEADS

FIELD

The invention relates generally to data acquisition via a barcode embedded in a badge and more particularly to a system and a method for recording sales lead data.

BACKGROUND

Convention registration companies provide registration and other services for conventions, tradeshows, conferences, exhibitions, and other such events. In many cases, a significant portion and, sometimes all, of the cost of presenting such an event is offset by revenues derived from space rental and service fees charged to exhibitors. The payment of these sometimes substantial exhibition fees can be economically justified because companies that exhibit at such events have found that the attendees of such exhibitions comprise a somewhat captive audience that may have been, at least to some extent, pre-selected via the registration process for their interests in the goods and services to be exhibited. Thus exhibitors can obtain a higher percentage of viable sales leads at a lower cost per lead than is possible by most other methods of "selling."

Conversely, under this model an event sponsor, an event management company, a convention registration company and a venue are all under pressure to deliver the necessary exhibitor services in a manner that minimizes the total cost per qualified sales lead obtained by the exhibitor while maximizing attendee satisfaction with both the exhibition and the entire event. Successfully accomplishing these goals enables recurring events to grow, thereby increasing the revenues of the event sponsors and organizers. For these reasons, the entire lead capture process must be treated as an integrated system that is optimized to satisfy the needs of all affected parties in an efficient and cost effective manner.

SUMMARY

A sales lead recorder and a method of recording sales lead data are presented.

In one example, the sales lead recorder includes a badge holder for receiving a badge. The badge holder is positioned from a lens by a fixed distance so as to establish a fixed focal distance between a badge (placed in the badge holder) and the lens. The badge includes an embedded code, which represents sales lead data associated with an attendee who may be wearing the badge.

To acquire the sales lead data, an imager is coupled to the lens and is configured to capture an optical badge image produced by the lens. The imager is further configured to capture an entire image of the badge, so that an embedded code may be placed at any location on the surface of the badge. Operationally, the imager converts the optical image into an electronic representation. A processor receives the electronic representation, discerns the embedded code, and produces sales lead data, which may be used by an exhibitor to generate a sales lead.

In one example, the embedded code may be a two-dimensional barcode. Additionally or alternatively, the processor may be configured to discern a portion of the sales lead data by a location of the barcode on the badge with respect to a surrounding perimeter of the badge. The embedded code, for example, may also be encrypted.

In another example, the lead recorder may be configured to be powered at least partially by a data cable. Advantageously, a user may use the power to initiate a partial boot-up, which facilitates a relatively quick configuration of the sales lead recorder before an exhibition begins.

In another example, the lead recorder may includes a reference code embedded on a surface of the badge holder so that a variety of system metrics may be computed while a badge is not positioned within the lead recorder.

In another example, the lead recorder may be configured to receive a removable memory for storing sales lead data, or other data, for example. The removable memory may be located within a housing of the lead recorder so that the sales lead data is stored within a discrete location, preventing a casual passer by from having access to the sales lead data. In one example, the removable memory may be password protected.

In an example method of operation, the sales lead recorder may be configured to read a variety of badges. The method includes scanning first and second badges and determining sales lead data associated with each badge. The first badge includes an embedded code located at a first location on the first badge. The second badge includes another embedded code located at a second location on the second badge. The first and second locations are at different locations with respect to each other. Advantageously, however, the lead recorder is capable of capturing sales data from barcodes located at different locations within a badge.

In the example method, the first and second embedded codes may be a barcode. The first embedded code may be a two-dimensional barcode and the second embedded code may be a one dimension barcode. In another example, the first barcode may have a higher density than the second barcode.

Another example method describes using at least one communication port to provide power to a portion of the lead recorder, to transfer sales lead configurations, and downloading sales lead data. The power may be used for a partial boot-up, for example. In addition, the sales lead data may be downloaded to a removable memory.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

FIG. 6 is a representation of a typical lead report form.
FIG. 7 is a representative list of data fields such as may be recorded on a trade show badge.

DETAILED DESCRIPTION OF THE DRAWINGS

Figure 1:
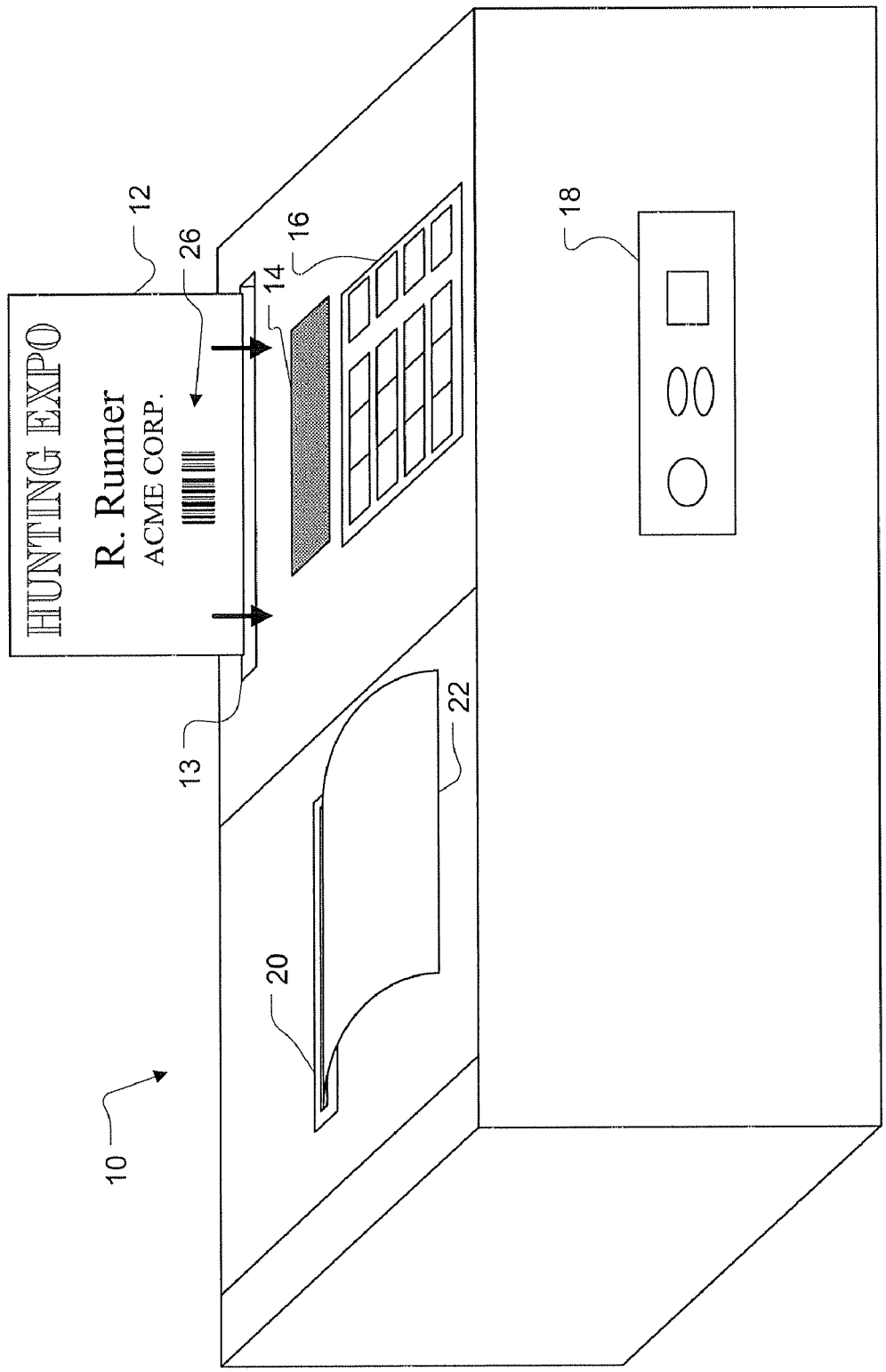
FIG. 1 is an isometric view of a lead recorder.

Turning now to the figures, FIG. 1 is an isometric diagram of a lead recording device 10, which may be used by an exhibitor to record sales lead data. The lead data may be associated with one or more attendees of an exhibition or "show," for example. In particular, the lead recording device 10 may be placed at a booth or venue associated with the exhibitor. When an attendee visits the booth, he or she will present a badge 12 that will be inserted into the lead recording device 10. In an alternative example, an external wireless (or cable connected) scanner, which will be described below, may be used to capture the embedded data. In either case, the lead recording device 10 will "read" the badge and capture a variety of embedded data located on the badge 12, which is associated with the attendee.

Externally, the lead recording device 10 may include a badge slot 13, a display screen 14, a keypad 16, and a variety of ports 18, which may be used to receive or output various forms of control signaling or data. The lead recording device 10 may also include a printing slot 20 for a printer (not shown) to output a printout 22 of data. In operation, an attendee provides the badge 12; the badge 12 is inserted into the badge slot 13; and, the lead recording device 10 uses an imager (described with reference to FIG. 3) to capture embedded data within the badge 12. In general, the embedded data is in the form of a barcode 26, and preferably a high density barcode, which will be described further with reference to FIGS. 4A-4B.

After the embedded data is captured, the lead recording device 10 converts the embedded data into sales lead data. The lead recording device 10 may be configured so that it also records data that identifies which attendees at an exhibition among those presenting badges for recording may be qualified sales leads along with related information such as described below. The lead recording device 10 may also capture data that is used to provide a variety of attendee analyses related to an individual attendee, a sampling of attendees, or other statistical calculations. Additionally, the printer may output the printout 22 in order to provide a hard copy of possible sales leads that should be followed up.

A typical printout may contain show-related information such as the name and location of the show; the date and time at which the lead was obtained; the attendee name and contact information; and, optionally, information that "qualifies" the lead. This qualifying information may include identification of specific product interests, acquisition timing and budget, decision making authority, type of response desired and the like. Where an exhibit booth is staffed by multiple sales personnel, the name or identifier of the person who captured the lead may also appear on the printout. The information appearing on a printout is generally determined by the exhibitor and may be a subset of that identified above, or may include additional or alternative information. Furthermore, all attendee information that is captured from a badge plus any information pertaining to the attendee that is entered by the exhibitor, which typically exceeds the information that is included on a printout, is recorded and retained within the lead recording device and can be retrieved in an electronic form and format.

At a component level, the lead recording device 10 includes a processor 30 that is in communication with a keypad module 32, a display module 34, a printer module 36, a code imaging module 38, and a communication interface/module 40. The processor 30 is used to generally refer to the assortment of components, such as data busses, power supply modules, dynamic and static memory, etc., that the lead recording device 10 may use to enable communication between and operation of the various modules within the lead recording device 10. For example, the processor 30 may receive an electronic form of the embedded data from the imaging module 38 and convert the embedded data into the sales lead data. The processor 30 may then communicate the sales lead data to the display 34 so that the user may view the sales lead data, to the printer 36 so that the user may acquire the printout 22 of the sales lead data, or to the communication interface 40 so that the user may download the sales lead data to an external memory, for example. In another example, the processor 30 may receive user instructions or configurations from the keypad 32 or the communication interface 40.

The processor 30, for example, may be an AMD Alchemy™ AU1100 (Advanced Micro Devices, Sunnyvale, Calif.) or another processor having comparable capabilities. In addition, the processor 30 may be configured to operate under a variety of operating systems, for example the Linux operating system. Alternatively an operating system such as, but not limited to VxWorks™ or CE.Net™ may be used. The preferred operating system is one that is designed for use in an embedded system. Deterministic operation, a small memory footprint, and minimum system resource requirements may be desirable features of an operating system, for example.

The processor 30 may also include a variety of memory modules for storing operating instructions, sales lead data, user configurations etc. In one example configuration, both SDRAM operating memory and non-volatile "flash" memory are provided. The flash memory is organized as two banks in a "mirrored" arrangement such that both banks are constrained to contain identical information. One portion of each bank contains a copy of the operating system and application software while another portion is used for the storage of captured lead data, customization parameters and similar information. Additional removable memory may also be present as described below.

In general the processor 30, and modules 32, 34, 36, 38, and 40 receive electrical power from an internal AC/DC converter (power supply) that converts alternating current at a nominal voltage of between 90 VAC and 264 VAC obtained from the AC mains to direct current at one or more lower voltages. DC/DC converters are used to subsequently convert one or more of these DC voltages to the other DC voltages that are required for the operation of the lead recording device. By way of example, the AC mains voltage is converted to 5 VDC and 24 VDC, the 24 VDC being applied directly to the printer module and the 5 VDC being subsequently converted to other needed voltages such as the 3.3 VDC, 2.5 VDC and 1.2 VDC that are required by the AU1100 processor. However, various power supply configurations exist. For example, the lead recording device may receive electrical power from one or more of an external AC/DC converter ("wall wart"), a battery, or a data cable such as a Universal Serial Bus (USB) cable or an Ethernet cable that is arranged so as to support the "Power Over Ethernet" (POE) operating mode. The DC voltage(s) received form such alternative power sources are converted to the specific voltages required by the lead recording device in a variety of manners, such as any of those described above, for example.

Power from one or more of the above mentioned sources may be supplied to the lead recording device simultaneously. All such power inputs are applied to a power switching circuit that may function in the manner of a "diode-or" connection. This circuit accepts power from the various connected sources, automatically selects the most appropriate power source from among those available, and supplies power from the selected source to the DC/DC converters. The switching between these various power sources can occur automatically without disrupting the operation of the lead recording device.

As some possible power sources may not be capable of providing the full amount of electrical current that is necessary to adequately power all of the modules of the lead recording device, provision is made for the lead recording device to automatically disconnect power from non-critical modules such as the printer on a selective temporary basis so as to ensure that critical modules such as the processor receive adequate power. To this end, each DC/DC converter except for those supplying power to the processor, may be provided with one or more "enable" inputs that permit the converters thus provided to be turned on or off under the control of the processor and/or fault detection circuitry. In some examples, the power selection circuit can additionally be configured such that it automatically diverts power obtained from a source other than a battery that is in excess of that needed by the lead recording device for purposes of charging the battery. This allows the battery to be used as a "backup" power source should power from the other sources that are connected to the power selector become unavailable.

Generally speaking, the keypad module 32, which may be comprised of a 12 key numeric keypad and four "function" keys, as shown in FIG. 1, for example, may allow a user to enter lead-related data into the lead recording device 10; to select various device functions; and, to enter operating parameters for various device options. Ten of the keys comprising the keypad may be semi-permanently assigned to the numeric digits 0-9, respectively. The remaining two keypad keys and the four function keys are definable in software and are assigned to functions such as "scroll up", "scroll down", "enter", "select", "clear" and "print" during device configuration. The specific function assigned to each of these keys is dependent upon the purpose for which the lead recording device is to be used during a show.

In general, the numeric keypad provides a space and labor efficient means for entering lead-related data. These data, which can include qualification data, responses to survey questions, and the like, are entered in the form of numeric codes, each of which corresponds to an exhibitor-defined option. For reference purposes, a printed table that identifies the numeric code that corresponds to each data option is provided on a slide-out tray that is incorporated into the lead recording device. Alternatively, an alphanumeric keyboard can be connected to the lead recording device through a data port (typically a USB port) to allow both numeric codes and textual information to be entered and recorded.

Function selection may be by means of a multi-level scrollable menu that is accessed and controlled via "scroll", "select," and "enter" function keys. The menu itself is presented on the display 14 that is described below. In use, the user scrolls to the desired menu item using the scroll keys; selects the item by pressing the select key; and, where appropriate, activates the selected item by pressing the enter key. User-accessible menu items include, but are not limited to, the ability to review and optionally print all or some portion of the captured leads; the ability to select the data to be printed on a lead report form and to control the format of this printing; and the ability to activate, deactivate, or modify previously authorized services and system functions. The specific menu items that are accessible to a given user are established by downloading custom configuration files to the lead recording device. Additional menu items that are accessible only to service personnel are intended to facilitate the testing, troubleshooting and repairing of the lead recording device.

Some menu selections allow or require a user to enter parametric data. As an illustrative example, if a user desires to password protect the lead data that has been captured by the lead recording device or to prevent unauthorized personnel from using the device, the user may scroll to and select the "enter password" menu item. This selection causes a prompt requesting entry of a password to appear on the display 14. The password is entered using the keys of the keypad 16 and recorded by pressing the enter key. The user is then requested to confirm the password by re-entering it. Upon confirmation of the password, the user is offered a sub-menu that allows selection of the particular items such as stored data; data printing or downloading; device configuration settings and/or use of the lead recording device itself that are to be password protected. This protection is activated by scrolling to, selecting and activating the "activate password protection" menu function.

The display module 34 includes the display 14, which may be comprised of a four line by twenty character per line dot matrix liquid crystal display and its associated electronic circuitry including a "character generator". The character generator can be programmed via a data download at system configuration time to provide a full alphanumeric character set in one or more of the languages that are supported by the lead recording device plus selected special characters and symbols. The display 14 allows the user to view user-selected portions of captured lead data; system menus; system status indicators; prompts that instruct the user on the next action to take; error messages and the like.

The printer module 36 may include, for example, a Seiko LTP2342 roll-fed ticket printer and associated control, character generation, and driver electronics. It should be understood that the printer module 36 may include a variety of printers. In general, the printer is primarily employed to print reports of captured lead data, but may also be used to print other ancillary documents such as, but not limited to survey response forms, coupons, and contest entry blanks. The data content, form and format of these and other documents are established during system customization, but may be changed by the exhibitor via the printer customization menu that is accessible as previously described using the keypad 16 and the display 14.

FIG. 6 shows an example printout that has been customized by a particular exhibitor for a particular show. The specific form and content of the printout is determined by each exhibitor for each show and may vary from that shown in this example. In this instance, the exhibitor elected to include the name and dates of the show, the name of the exhibitor and the sequence number of the lead in the report header. The next line includes the date and time at which the attendee visited the booth followed by the attendee contact information. The "visitor profile" section contains lead qualification information that was extracted from the attendee badge while the "qualifier" section contains additional qualifier information that was manually entered in to the lead recording device at the time that the lead was captured. The sales person did not record any comments pertaining to this particular visitor nor was a survey or contest conducted.

Exhibitors may use the previously described menu system to enable the printing of a lead report form such as is shown in FIG. 6 each time that a badge is inserted into the lead recording device. Other exhibitors, however, use the menu system to disable this function, preferring to use other menu commands and the print function key to print all or some of the captured leads in a single operation at convenient time. Yet other exhibitors use the menu system to entirely suppress printing of lead report forms, preferring instead to purchase an optional service that allows the captured lead data to be downloaded in electronic format to a removable flash memory or other data storage device or uploaded to an external PC, PDA or network server.

Figure 3:
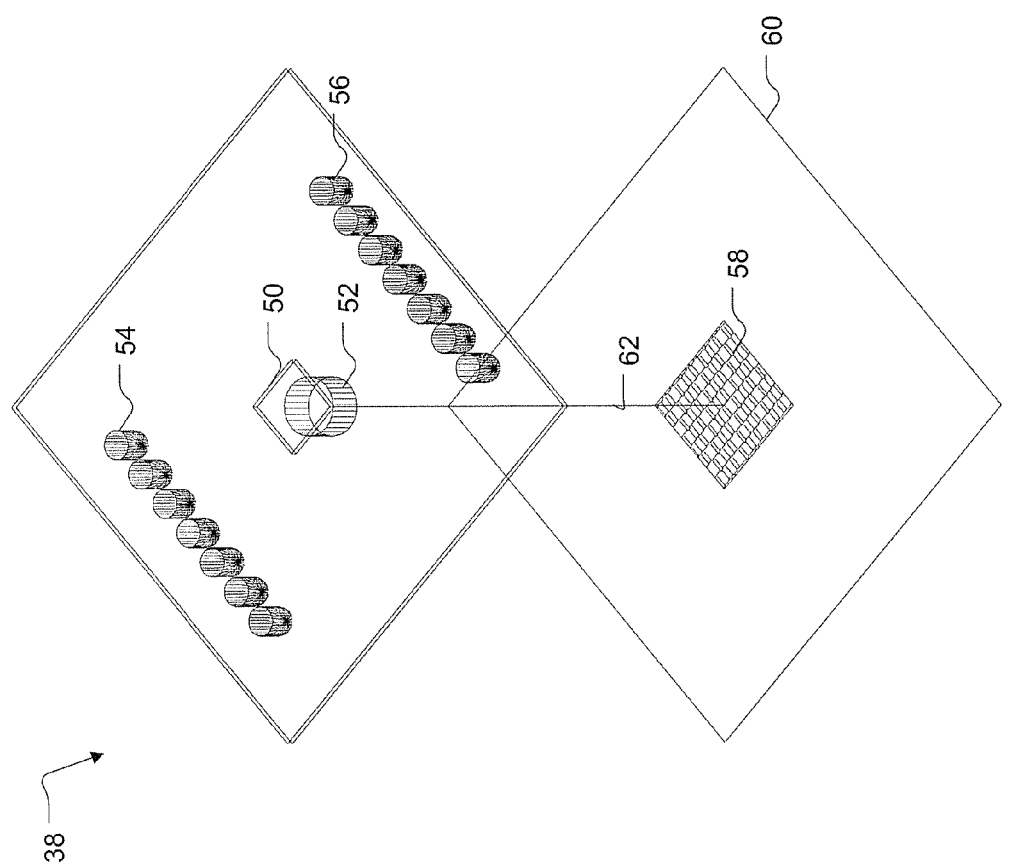
FIG. 3 is an isometric view of a code imaging module.

FIG. 3 is a block diagram of the imaging module 38 that comprises an imager 50, a lens 52, arrays of light emitting diodes (LEDs) 54, 56, a reference or secondary barcode symbol 58, and a badge holder 60. The imaging module 38 may be positioned so that the badge slot 13 is located above the imaging module 38. When a user inserts a badge into the badge slot 13, the badge holder 60 may receive the inserted badge. The LED arrays 54, 56 emit light, illuminating the badge so that the imager 50 may capture a reflected image of the badge.

The imager 50, for example, may include an OmniVision 9120 progressive scan monochrome imager (OmniVision Technology, Sunnyvale, Calif.) that combines a 1280×1024 sensor array having 5.2 micron square pixels with the associated control and signal conditioning circuitry into a single device. The signal conditioning circuitry of the imager 50 allows for functions such as gain setting and exposure control, the setting of the black level and white balance, the control of image blooming and smearing, and removal of fixed pattern noise prior to the digitization of the captured image by a ten bit analog to digital converter (ADC) that may also incorporated into the imager 50. The resulting digitized image data may be delivered at a rate of up to fifteen frames per second to the processor which performs the additional steps needed in order to extract the information that is embedded in the barcode image. These functions may equivalently be partitioned and implemented in other manners.

The lead recording device 10 may capture and extract (i.e., read) data from barcode symbols that may be printed anywhere within the printable area of a commonly used 4.0"× 3.25" tradeshow badge, but may be adapted for use with badges having other dimensions. The imager 50 may be capable of capturing an image of the entire printable area of the badge while maintaining an acceptable level of image quality. Moreover, the imager 50 should be capable of reading many different barcode symbologies including high information density symbologies such as PDF-417, DataMatrix™, or GoCode™ wherein the minimum feature size to be resolved is less than 15 mils (0.015") and preferably less than ten mils (0.010").

Generally speaking, the spatial resolution of a lens system within the imager 50 increases and the DOF decreases as the NA of the lens system is increased (f/# decreases). The magnification of a lens system is defined by the ratio of the image side to object side NA's of the lens system, or alternatively, the ratio of the sizes of the fields of view required on the image and object sides of the lens. Where a pixilated detector is being employed in the image plane, the dimensions and spacing of the pixels impose a further known limit on achievable spatial resolution at both the image and object planes. These conflicting constraints along with consideration of factors such as the requirement for a short working distance and the desirability of a high optical throughput coupled with low image aberrations are reconciled in the imager 50 through the selection of a Sunex (Sunex, Inc, Carlsbad, Calif.) DLS853-C lens assembly as the lens 52.

As the working f/# of the selected lens is low, for example in the description above f/# is about 2.2, the DOF over which acceptable spatial resolution is obtainable is limited, thus requiring that the lens to badge distance be tightly controlled. In the lead recorder 10, this is accomplished by utilizing a slot-type badge holder 60 in which the badge is introduced through slot 13 in the housing of the lead recording device and held in place against a flat surface that is located at a precisely calibrated distance from the lens.

It is desirable that the object plane (badge) be illuminated in a manner that results in a uniform image intensity across the entire sensor area of the imager array 50. This is accomplished by using the LEDs 54,56. By using an electrical current supplied to each of the LEDs 54, 56, which is provided by a current source that is, in turn, under control of the processor 30. In this manner, the current through and, therefore, the light output of each individual LED can be independently controlled so as to achieve uniform illumination in the image plane of the imager 50.

The badge holder 60 incorporates the barcode symbol 58 that is printed on or attached to the surface of the badge holder that faces the lens. If the badge 12 is not present in the badge holder 60, an image of the secondary barcode symbol 58 is captured by the imager 50, converted to digital form and delivered to the processor 30. In one example, these images are repeatedly captured, digitized and transmitted at a rate that was set at approximately five image frames per second, but with the selected imager 50, could have been set at any convenient rate. The processor analyzes each captured image of the symbol 58 and extracts various metrics such as illumination intensity and uniformity, image contrast ratio, edge gradients (a measure of image sharpness) and image spatial resolution. The values of these extracted metrics are compared with previously established reference values to determine whether the imager subsystem along with the associated image processing and analysis software being executed by the processor 30 are operating properly. Furthermore, the processor 30 uses deviations of some metrics from their respective reference values as the basis for adjusting system operating parameters so as to restore proper system operation. By way of example, deviations in the illumination intensity and uniformity metrics may be used by the processor 30 as the basis for adjusting the currents through one or more of the LED's 54, 56 so as to restore the desired illumination intensity and uniformity at the imager 50. Should the values of one or more metrics be outside of acceptable limits and not be correctable by processor action, the processor records the appropriate operating parameters and other relevant information to an error log to facilitate subsequent troubleshooting and repair, issues an appropriate error message to the user by displaying the message on the display 14 and, in some cases, also actuates an annunciator such as an LED or an audible transducer (not shown).

When the badge 12 is inserted into the badge holder 60 through the slot 13, the leading edge of the badge occults the barcode symbol 58 that is located on the badge holder 60. This occultation changes the information that is being extracted from the images being supplied to the processor and signals to the processor that a badge has been inserted. The processor therefore treats the images subsequent to this occultation as being images of a badge, rather than of the reference symbol.

It should be noted that occultation of the barcode symbol 58 is followed by one of two subsequent events. Detection of a barcode symbol that is different from that of the barcode symbol 58 indicates that a badge has been properly inserted into the recorder. The new badge symbol is captured and processed as described below. Occultation of the barcode symbol 58 followed by its reappearance without the intermediate detection of a different barcode symbol signifies that the badge was either incompletely inserted into the lead recorder 10 or it was inserted such that a barcode symbol faced away from the imager 50. In either case, an error message is presented to the exhibitor along with a prompt that the badge be properly reinserted. Insertion of the badge in an inverted orientation is also detected, but as this error can be automatically corrected by the decoder algorithm, it is not reported to the exhibitor.

In one example, the processor 30 utilizes the Omni Swift™ decoder algorithm to identify the specific barcode symbology that appears on the badge although other decoder algorithms can be used to equivalent effect. Once the symbology has been identified, the decoder algorithm extracts feature clusters corresponding to the recorded bits of information from the symbol; removes any encryption that was applied during creation of the symbol; decodes the extracted information; and verifies by means of error detection/correction codes, checksums and other indicators of data integrity that are embedded in the symbol that the extracted information is a complete and accurate representation of the information contained in the barcode symbol. Badge images are captured and processed until the decoder algorithm determines that the barcode symbol was properly captured, unpacked and decoded.

The extracted information is then passed to a second algorithm that removes other security measures such as secondary encryption that remain in the extracted information; establishes the authenticity of the extracted information by examining various authenticators that are embedded in the information stream; and, assembles the extracted and authenticated information into the proper form and format for presentation to the user and for storage within the multiple lead recording device memories.

The configuration of the imaging module 38 allows a variety of barcodes and other types of embedded images on a badge to be read. In general, low density barcodes such as Code 128, UPC and Codabar, have been used in known barcode readers because the large feature sizes associated with low density barcodes are easier to capture and decipher. Unfortunately, low density barcodes are limited in the amount of data that the low density barcode can contain. Exhibitors desiring to capture more information or exhibition sponsors who wish to provide a measure of access control, for example, may be restricted by the limited amount of data that a low density barcode may hold. A linear barcode symbol, by way of example, is typically limited to containing no more than ten or twelve characters of information plus any applicable error detection/correction codes, pre-ambles, post-ambles and the like in a single symbol. Using such symbologies to record a greater amount of information on a badge requires the printing of multiple symbols on the badge. This represents inefficient utilization of the limited printable area on a badge and introduces complications into image capture, decoding and the extraction of information.

High density barcodes, on the other hand, may relate a lot more information associated with an attendee. Examples of high density barcodes, as mentioned above, include PDF-417, DataMatrix™ and GoCode™. Such codes obtain their increased information density by representing the encoded data in the form of a compact two dimensional array and through the use of reduced feature sizes in the barcode symbol. A high information density barcode symbol may contain several hundred to over one thousand characters of information in approximately the same amount of badge area that some low density codes require in order to store 10-12 characters of information. One portion of the additional information capacity that is provided by a high information density symbology is typically employed to contain additional attendee and show-related information. A second portion of the additional capacity may be used to support various data security and data integrity features. A third portion of the additional capacity may be used to improve robustness by permitting multiple copies of the information to be embedded into a single symbol.

The configuration of the imaging module 38 allows the lead recording device 10 to capture an entire badge image, including high density barcodes. Advantageously more information may be captured. FIG. 7 shows a representative listing of data fields of types commonly recorded on trade show badges. In this particular listing, the majority of the data fields are allocated to containing the designated information in particular forms and formats. The fields designated "Def.1" and "Def.2", however, may contain arbitrary alphanumeric data strings that may be printed on the lead report form. The remaining data fields are allocated to a variable number of three-character codes (triplet) that represent various additional attributes of the attendee. By way of example, one such triplet may designate that the attendee expects to make a purchase within 30 days while another triplet may designate the approximate budget that the attendee has available for such purchases. Other examples of information encoded in these triplets appears in the "visitor profile" section of the lead report presented in FIG. 6. Additional or alternative information may, of course, be recorded on the badge in addition to or as a replacement for that listed in FIG. 7. For example, a low density code may be able to record the name of an attendee in a given amount of badge area whereas a high information density symbology may allow recording the attendee name, position, affiliation and contact information within the same area. Alternatively, this same area may be used to record the attendee name, authenticators, and permissions to enter various show venues and events. In practice, a high information density symbology permits recording detailed attendee identification and demographic information as well as authentication and permissions information within a single symbol. This, in turn, permits a single badge to be used for multiple purposes whereas multiple badges printed in a low density code may be required to accomplish the same ends. Furthermore, recording complete identification, contact and demographic information on a badge relieves the exhibitor from having to separately retrieve much of this information from another source such as a show registration database.

Figure 4A:
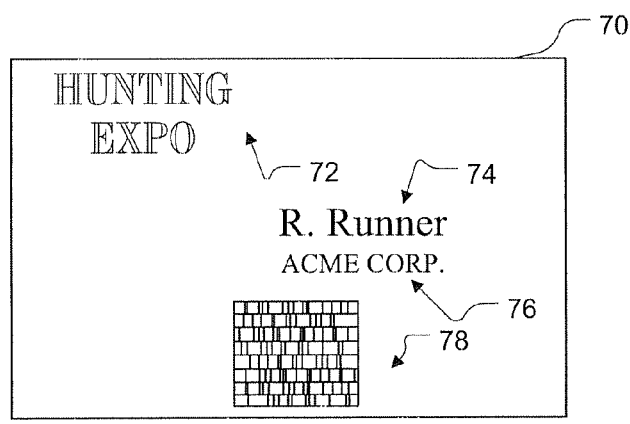
FIGS. 4A-B are pictorial diagrams of exhibition badges.
Figure 4B:
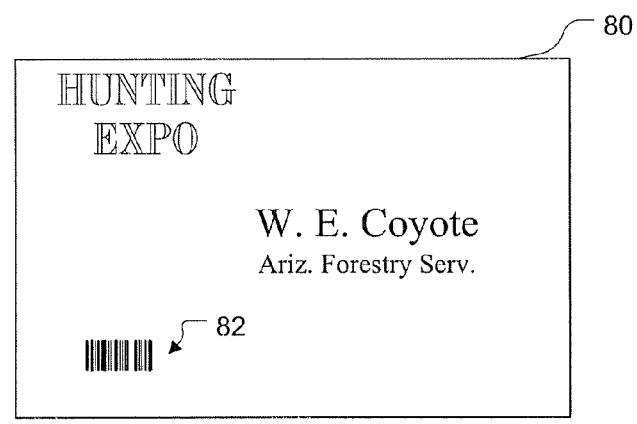

FIGS. 4A-C are examples of various badges. FIG. 4A shows a badge 70, that includes a show logo 72, a name 74, an affiliation 76, and a barcode 78. The logo 72 and the name 74 the affiliation 76 are human readable. The barcode 78, on the other hand, is machine readable. The imaging module 38 may also be configured to capture human readable text, such as the logo 72, for example. The badge 70 may be a variety of colors for esthetic and trade dress reasons as well as to convey additional information about the attendee. For example, a distinctively colored graphical element such as a stripe may be used to distinguish between attendees, exhibitors, show staff and other personnel classifications.

The layout of elements within the badge 70, such as the logo 72 or the barcode 76, may differ between shows. Therefore, the imaging module may also be configured to capture information from a badge, independent of where the information is located on a badge. Moreover, the lead recording device 10 may also discern additional information relating to the placement of a barcode within a badge (i.e., the location of the barcode on a surface area of the badge with respect to the perimeter of the badge). For example, the barcode 78 is placed at the bottom-center of the badge 70 in FIG. 4A. FIG. 4B, on the other hand, shows a badge 80, which includes a barcode 82. Unlike the badge 70, the barcode 82 is placed at the bottom-left of the badge 80 with respect to a perimeter of the badge. The placement of the barcode 82 within respect to a parameter of the badge 80 may be used to convey that badge 80 is an attendee badge. Badge 70, however, may be an exhibitor badge. The lead recording device 10 may be able to read both badges 70, 80 and the lead recording device 10 may also be able to discriminate between the two badges 70, 80 and produce appropriate sales lead data (i.e., lead data targeted for an exhibitor and lead data targeted for an attendee). In addition, the barcodes 78, 82 may be different types. For example, the barcode 78 may be a two-dimensional barcode and the barcode 82 may be a low-density one-dimensional barcode.

Positional encoding in such a manner may similarly be employed as an additional security feature when a badge is used for purposes such as access control. In this use, both the information contained within the barcode symbol and the positioning of the symbol on the badge must be correct in order for the badge to be accepted as being authentic.

Figure 2:
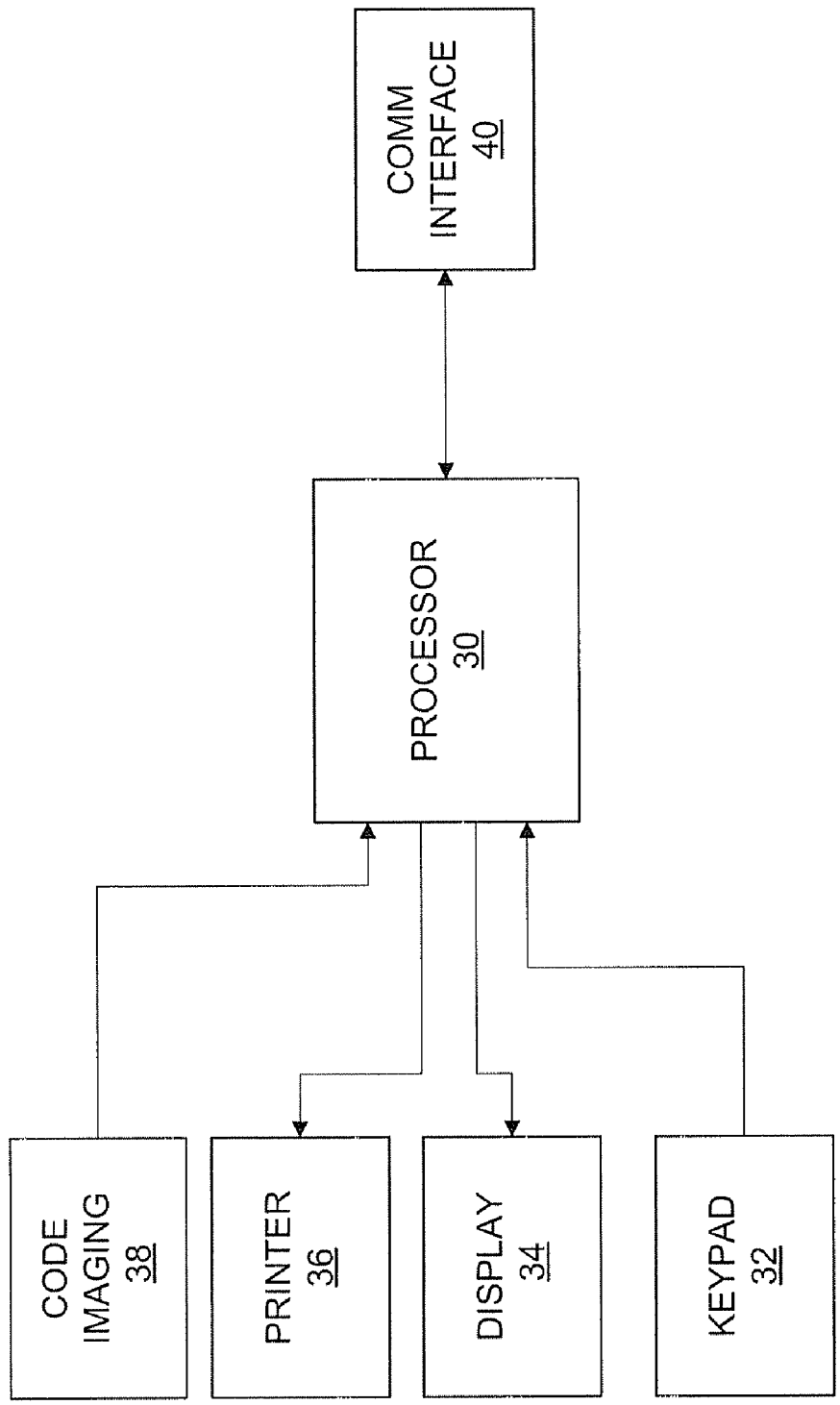
FIG. 2 is a simplified functional block diagram of a lead recorder.

Returning now to FIG. 2, the communication interface/module 40 may provide the lead recording device 10 with a variety of interfaces for receiving and outputting data or other types of signaling, such as control signaling. For example, the communication interface may comprise USB ports, serial ports, IR ports, and/or data card ports, such as the ports 18 shown in FIG. 1. Ports providing wireless connectivity may also be provided. Such ports may be used to transfer data between the lead recording device and one or more external devices. The availability of multiple modes of communication greatly enhances the utility of the lead recording device.

In general, the lead recording device may be programmed to receive any data that is presented at any one of or any combination of these communications ports. The lead recording device may also be programmed to combine these data with data captured from a badge or entered via the keypad and to transmit some or all of these data to external devices attached to one or more of the communications ports. Furthermore, the lead recording device may be programmed to modify or reformat the received or captured data before transmitting it to an external device. The types of data received or transmitted, their forms and formats, and the port or ports via which such receiving or transmitting occurs are established during the programming of the lead recording device as modified by any customization that is performed during checkout.

In certain examples, communications ports may be used to allow the lead recording device 10 to acquire information from external devices as required by a particular application or installation. By way of non-limiting example, one such application may be implemented by connecting an alphanumeric keyboard and a magnetic stripe (credit card) reader to the lead recording device by means of a USB communications port (or alternatively by means of an IRDA or RS-232 port) such that an attendee could pay for entrance to an event at the point of entry to the event. Furthermore, the same lead recording device may be connected via an Ethernet communications port to a server which, in turn, is connected to a remote database via the Internet. This arrangement may permit the event database to be updated to reflect the payment of the event fee and permitted the credit card payment to be validated by and registered with the credit card company at the time of payment.

By way of another example, a traditional tradeshow exhibit booth may have a floor area of approximately 100 square feet and is staffed by one or two sales personnel at any one time. The lead recording needs of such a booth may be accommodated by a single lead recording device. Some booths are, however, larger and can range in size from a few hundred square feet to, in certain exceptional cases, in excess of 100,000 square feet. Such booths may be typically staffed by large numbers of sales persons and require multiple lead recording devices. It is not uncommon in such situations for sales personnel to have to travel significant distances between the point of contact with an attendee and the location of the lead recording device or for several sales personnel to be contending for the use of the same lead recording device at the same time. The use of multiple lead recording devices in such situations is also inconvenient in that it requires that the leads captured by the devices be combined, consolidated and correlated in order to prepare a list of those leads to be followed up. This may be mitigated by providing each of the sales persons working in a large booth with a wireless handheld barcode reader that is used to capture lead data from attendee badges at the point of contact. Each handheld reader may then transmitted this captured lead data to any one of the several multiple lead recording devices in the booth via a wireless data link, or the data may be downloaded at a later time to any convenient lead recording device via a USB port. Each of lead recording devices may be connected to an in-booth Ethernet network that permits all of the captured leads to be uploaded to an in-booth server that updates the consolidated list of leads as each new lead is delivered.

In yet another example, exhibitors who have purchased a service that allows them to obtain their captured leads in both electronic and printed form may upload their data from the lead recording device to a removable USB flash memory device attached to a USB port or to upload their data to a laptop computer or personal digital assistant (PDA) via connection to a USB, Ethernet, wireless or IRDA port depending upon which communications means are supported by the receiving device. In yet another example, a communication port on a lead recording device may be used in an access control application to actuate a door lock.

The ability to customize lead recording devices to the unique needs of individual exhibitors may be a significant contributor to exhibitor satisfaction with the lead recording device 10 and an associated exhibition and also permits an event registration company that provides lead recording devices to an exhibition to offer a variety of value-added services at an extra charge. Traditionally, the event registration company performs this customization prior to delivering the lead recording devices to the show venue based upon specifications provided by the exhibitor at the time that the order for the lead recording device is placed. It is, however, sometimes necessary to customize devices at or during the show. This is often necessitated by exhibitors who have not pre-ordered devices; exhibitors who change their orders or their specifications for unit customization; and the need to occasionally replace a device that has failed during use. "At show" customization is usually performed at or in the vicinity of a "service booth" at which the event registration company issues (checks out) and retrieves (checks in) lead recording devices and provides other services associated with lead recording devices.

Pre-show customization of lead recording devices may pose a significant logistical challenge to an event registration company. By way of non-limiting example, it may be common for the event registration company to have to check out several hundred to several thousand lead recording devices to exhibitors during a short period of time before the opening of a show and to check in these same devices in a similarly short period of time at the end of the show. This requires that each order be accurately serviced in a time and labor efficient manner. When the devices are pre-customized for each exhibitor, this model necessitates that all of the devices allocated to the show be located within immediate proximity to the service desk and that the location of each device be known with a high degree of precision.

Given that the space allocated by most tradeshows to service booth operations is often quite limited, congestion in the vicinity of the service booth may result in a decrease in efficiency. Efficiency may be further substantially decreased if a lead recording device is not in its designated storage location. In such cases, it may be necessary for service booth personnel to search through the inventory of available devices in order to locate the one specific device required. Another factor that reduces the operational efficiency of the service booth is that it is necessary to "power up" each lead recording device in order to verify that it is operating properly and that it is properly customized for the exhibitor to whom it will be issued. This is a time and labor intensive step in the checkout process. Similarly, devices that require customization at the time of checkout seriously disrupt service booth workflow, consequently significantly increasing the amount of time and labor needed to fulfill an order and reducing operational efficiency. As traditional pre-show customization can be seen to result in decreased operational efficiency and, therefore, decreased service booth productivity and increased operating costs, it is important that a lead recorder be efficiently customizable.

The lead recorder 10 may be preferably customized at the time of checkout in order to permit improved and more efficient service booth operation. In this manner, only un-customized devices may be delivered to the show venue. A small stock of lead recorders may be is maintained in the immediate vicinity of the service booth and are replaced as needed from the remaining stock which is in a separate, but convenient location relative to the service booth. This reduces congestion in the immediate vicinity of the service booth.

When checking out a device to an exhibitor, service desk staff person takes the next available device from the local stock and connects a data cable (USB or Ethernet with POE capability) to the appropriate communication port, the other end of the cable being previously connected to the service desk server. As the lead recording device 10 is designed such that it can receive sufficient electrical power for customization from a USB or Ethernet/POE cable, the power connection to the AC mains may not be required.

Making only one connection saves time and labor in this step. In addition, when being powered from a data cable, the lead recorder 10, may execute an abbreviated boot-up process and is, therefore, available for the downloading of customization software sooner than if it was required to execute a full boot-up process. In parallel, the service desk staff person accesses the previously placed order, verifies the requested customizations with the exhibitor, and initiates the download of any necessary customization software. Changes to the requested customizations can be made at this time. Download management software on a server may obtain a lead recorder's serial number; determines the operational status and current configuration of the lead recorder; selects the appropriate software modules for downloading; downloads the selected software modules; verifies that the software has downloaded properly; terminates the download process, and prints any necessary checkout documentation. As only those software modules that are needed by the particular device are downloaded, the process is can be significantly faster than if a complete software download were to be required. This method further treats new orders, replacement orders and order changes in the same manner as a regular order, rather than as an "exception" that can significantly disrupt service booth workflow.

Similar benefits accrue during check-in. Powering the unit from a USB or Ethernet/POE data cable rather than from the AC mains allows a lead recorder's serial number to be determined and the captured lead data to be uploaded to a server concurrently with the printing of a receipt for the device. Alternatively, the exhibitor may have purchased a value added service that allows the exhibitor to upload the captured lead data in electronic form to a removable USB flash memory device, a laptop computer or a PDA. The USB flash memory device may be installed in an external USB communications port or, for increased data security, may be installed in a user accessible internal compartment. If the captured lead data is uploaded by the exhibitor, additional time can be saved during check-in as uploading of the data to the server can be deferred to a more convenient later time. In this instance, a service booth staff person uses a handheld barcode reader that is connected to the server to read the serial number of a lead recording device. This causes the receipt to be printed automatically.

Uploading the captured lead data to a server during check-in provides the exhibitor with an archival data backup; allows the event registration company to provide the exhibitor with value-added services such as the preparation of customized mailing lists or the fulfillment of information requests; and allows the event registration company to provide the event organizer and the venue with show statistics such as the number of attendees on the show floor as a function of time, the flow of attendees through the exhibit area, the number of exhibitors approached per attendee, and the like. These and other statistics are useful to the event organizer and the venue in both the planning and the marketing of future shows.

Numerous show and exhibitor-specific customizations of a lead recorder are possible. By way of example, many event registration companies operate internationally and participate in shows in many countries. For this reason, one common customization is the selection of the national language character set that is appropriate to the show venue. This customization allows both the messages appearing on the display and the information appearing on the lead report forms to be presented in the appropriate national language and character set.

As another example, some, but not all exhibitors prefer that show-specific information be printed on each lead report as an aid to managing the reports from multiple shows. This show specific information may include, but is not limited to the name of the show, its location, the show date(s), the number of the exhibit booth at the show, or some subset thereof. Similarly, some, but not all exhibitors prefer that each lead report be date stamped, time stamped, or both. Additionally some, but not all exhibitors require that if multiple sales personnel are working in a booth, the name of the sales person who collected a lead appear on the corresponding lead report form.

A typical high information density attendee badge contains far more attendee identification, contact and demographic information than can realistically and usefully be printed on a lead report form. Exhibitors, therefore, specify that only that subset of the attendee information that is directly applicable to their particular method of following up on sales contacts be printed on a lead report form. This information can be different for each exhibitor. Similarly, some, but not all exhibitors prefer to obtain lead qualification information at the same time that they collect the lead. The types of lead qualification information collected by any particular exhibitor depends on numerous factors such as, but not limited to the number and type(s) of products or services on display in the booth and the number and type(s) of products and services that are available from the exhibitor, but which are not on display. In addition, some exhibitors use the contact with attendees to conduct market research by asking survey questions of the attendee or of exciting interest in their products by conducting a contest. The presented lead recorder allows these and other similar parameters to be customized for each exhibitor or even for each lead recording device rented by the exhibitor.

Customization also allows a lead recording device to deliver specific value added services that have been ordered by the exhibitor. By way of example, some exhibitors order a copy of all collected lead information in electronic form to supplement the subset of this information that they have received as printed lead report forms. Obtaining this information in electronic form simplifies its addition to the exhibitor's sales lead management system and is also useful in conducting market research. Other exhibitors may request that the capabilities provided by the lead recording device be supplemented by the addition of ancillary external devices such as magnetic stripe readers, RFID readers, or alphanumeric keyboards or by the enablement of various networking or access control capabilities. The use of wireless handheld barcode readers in conjunction with the present lead recording device is particularly instructive in this context. Due to the large numbers of radio frequency transmitters that are typically present on a show floor, there is a high probability of interference between these devices and between these devices and the radio frequency systems that are used to manage and control venue operations. For this reason, many venues restrict the use of radio frequency devices. The presented lead recorder may address these restrictions by explicitly associating each handheld wireless reader or exhibitor-supplied wireless device such as a laptop computer or PDA with a specific lead recording device and by suppressing certain transmitter operating modes such as BlueTooth "beacon" operation during the customization process These customizations may also increase the security of wireless communications.

Figure 5:
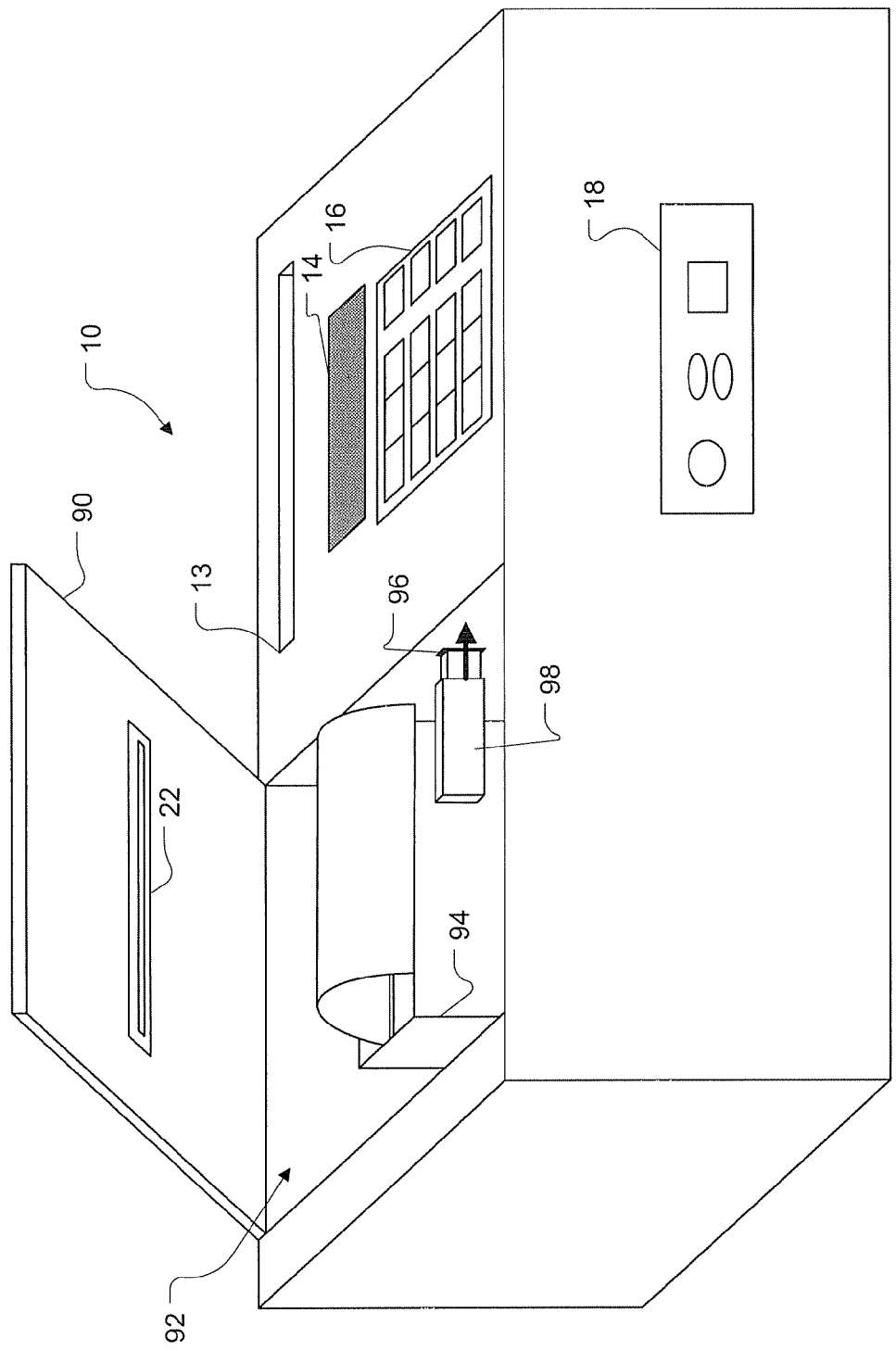
FIG. 5 is an isometric view of the lead recorder of FIG. 1 having an open panel.

To enhance the efficiency of customization, the downloaded software may be prepared in the form of compact data tables. Some of these tables, specifically those containing parameters such as permissions that activate value-added services and the encryption keys used to provide data security are hidden, locked, marked for read-only access, encrypted and/or otherwise suitably protected against unauthorized access or changes. Those data tables that are comprised of exhibitor preferences are made accessible through the menu display and keypad and can be subsequently altered by the exhibitor As previously noted, the communication interface/module 40 may also include additional ports that may be discretely located within the lead recording device 10. FIG. 5 is another external view of the lead recording device 10 having an open panel 90, which exposes an interior portion 92. Within the internal portion 92 are a printer 94, a memory port 96, and a removable memory device 98. The memory port 96 receives the memory 98. The memory 98 may be used to store a variety of data including lead data. The memory 98 may, for example, be a removable USB memory drive and the memory port 96 may be a USB port. In an alternative example, the memory 98 may be compact flash memory card and the memory port 96 may be a port that is configured to accept the compact flash card. Other removable memories are possible.

By enclosing the memory 98 within the lead recording device 10, and not allowing the memory 98 to be externally exposed, the memory 98 may be relatively accessible to a user, but the memory 98 is still "hidden" to a casual passer-by. Moreover, the memory 98 may be "hidden" in a variety of locations within the lead recording device 10 and the memory 98 may be configured so that it is "locked" into the lead recording device 10 by a hardware mechanism, either by locking the panel 92 shut, or locking the memory to the memory port 96. In this way, only an exhibitor or other person responsible for the lead recording device 10 may remove the memory 98.

Removable memory also allows an exhibitor to receive lead data more efficiently. Typically, exhibitors rent or borrow a lead recorder from an exhibition registration company. Lead recorders are usually given out at the beginning of an exhibition and returned before an exhibitor leaves the exhibition. In addition, downloading and uploading data to a lead recorder can be a time consuming process. However, because the memory 98 is removable, an exhibitor may simply insert or remove the memory 98 and thus acquire or return the lead recording device 10 with minimal or no uploading or downloading.

The data contained on a tradeshow badge has significant potential economic value to exhibitors, tradeshow organizers, and others. For this reason, the present invention incorporates numerous features to ensure and maintain data security and integrity that are lacking in many devices of the prior art. A few of these features include employing a proprietary high information density symbology; super-encrypting the information recorded on the badge; password protecting the application software and data in the lead recording device; employing a high level of data redundancy; embedding show-specific authenticators within the barcode symbol, and "hiding" removable memory devices. Other methods such as using the memory management unit (MMU) in the AU1100 processor to restrict memory access and to prevent critical data and parameters from being changed are also employed.

The use of a handheld wireless badge reader, wireless-equipped laptop computer or PDA, or similar device in conjunction with the lead recording device necessitates the implementation of additional security measures in order to prevent the wireless transmissions from being compromised. The presented lead recorder may incorporate a BlueTooth™ transceiver that can be used to communicate with a BlueTooth™-equipped handheld wireless badge reader, laptop computer, PDA or similar device. An exemplary handheld reader that may be used with the present invention is the CodeReader-II™ manufactured by Code Corp.

Use of a proprietary high information density barcode symbology in and of itself provides a significant level of data security as readers and decoders for such symbologies are not widely available. Furthermore, the data to be recorded on a badge may be encrypted prior to being super-encrypted during its conversion to a barcode symbol. Most wireless data communications protocols such as BlueTooth™ superimpose yet another level of encryption on the data. Thus, even if a barcode reader is capable of reading the proprietary symbology is available or the wireless transmission of this decoded data is intercepted, at least one level of encryption remains to provide data security. This security may be supplemented by the use of various "data hiding" techniques that take advantage of the excess data storage capacity of a high information density symbology.

For additional security as well as to conserve spectral bandwidth within the exhibition venue and to minimize the potential for interference between multiple BlueTooth™-equipped devices operating in close proximity to one another each handheld reader is "locked" such that it can communicate only with one specific lead recording unit and, conversely, each lead recording device is locked to communicate only with specific handheld readers. This locking or association of one or more handheld units with a single lead recording device is implemented during the checkout process by programming each unit with the MAC addresses of only those other units to which it is allowed to respond to and communicate with. The locking process also includes disabling of the BlueTooth™ beacon function to prevent other BlueTooth™-equipped devices from "discovering" and establishing communication with either the handheld reader or the lead recording device.

During checkout the lead recording device may be enabled to permit the wireless downloading of captured leads to a laptop or other computer in a manner that is analogous to that previously described for the downloading of lead data via a wired connection. When wireless downloading is enabled, the lead recording device is associated with the specific receiving computer in the manner described above. Although the wireless security features are described with reference to BlueTooth™ communications, similar features can be implemented if other wireless communications methods such as WiFi™ and USB-On-The-Go™ are used.

Additional security considerations apply when a lead recording device is used for access control or identity verification purposes. Attempts to breach such security are often as simple as presenting a forged or stolen badge. Forgeries are often easily detected by methods such as previously described while stolen badges can often be detected by expedients such as requiring presentation of the badge plus a second form of identification. This second form of identification may be as simple as a password or PIN code, or as complex as a biomorphic identifier such as a retinal or finger print. Where warranted, additional security measures known in the art may be implemented using the present invention, possibly in conjunction with ancillary devices such as fingerprint readers that communicate with the present invention via a communication port.

The illustrated examples are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A sales lead recorder, comprising:
    a housing;
    a badge holder for receiving and holding a badge, the badge holder including a slot formed through the housing, wherein the badge includes a printable surface area defined by a surrounding perimeter of the badge and a code embedded in the printable surface area, wherein the badge holder includes a reference code embedded on a surface of the badge holder, wherein the reference code is for computation of at least one system performance metric, the badge holder being configured such that the badge occults the reference code when inserted into the slot;
    an imaging module positioned in the housing that includes:
        a lens that is separated from the badge holder by a fixed distance; and
        an imager coupled with the lens, wherein the imager is configured to capture an optical image of the surface area created by the lens, and convert the optical image into an electronic representation, and wherein the imager and the lens are configured to capture the entire printable surface area of the badge;
    a processor coupled to the imager, wherein the processor is configured to receive the electronic representation, determine the embedded code within the electronic representation, and produce sales lead data associated with the badge.

2. The device as in claim 1, wherein the embedded code is a two-dimensional barcode.

3. The device as in claim 1, wherein the embedded code is a barcode, and wherein the processor is configured to discern a portion of the sales lead data by a location of the barcode on the badge with respect to the surrounding perimeter.

4. The device as in claim 1, wherein the lead recorder is configured to be powered at least partially by a data cable.

5. The device as in claim 1, wherein the embedded code is encrypted.

6. The device as in claim 1, wherein the reference code is a barcode.

7. The device as in claim 1, further comprising a removable memory for coupling with the processor, wherein the removable memory is configured to store the sales lead data.

8. The device as in claim 7, wherein the imaging module and the processor are located within the housing, and wherein when the removable memory is coupled with the processor, the removable memory is also located within the housing.

9. The device as in claim 7, wherein the removable memory is password protected.

* * * * *